March 30, 1971  S. A. CANFIELD ET AL  3,573,015

METHOD AND APPARATUS FOR CONTROLLING LIQUID LEVELS

Filed May 9, 1968  3 Sheets-Sheet 1

SHELDON A. CANFIELD &
CLETIS L. ROBERSON
INVENTORS

BY

*Staelin + Overman*
ATTORNEYS

# United States Patent Office 3,573,015
Patented Mar. 30, 1971

3,573,015
METHOD AND APPARATUS FOR CONTROLLING LIQUID LEVELS
Sheldon A. Canfield and Cletis L. Roberson, Newark, Ohio, assignors to Owens-Corning Fiberglas Corporation
Filed May 9, 1968, Ser. No. 727,805
Int. Cl. C03b
U.S. Cl. 65—2
10 Claims

ABSTRACT OF THE DISCLOSURE

Method and apparatus for controlling the level of a body of material in a container when replenishing material removed from the body, by sensing levels outside of a predetermined range of levels of the material, increasing the rate of feed of the replenishing material by an amount proportional to the time the level is below the range, and decreasing the rate of feed of the replenishing material by an amount proportional to the time the level is above the range. To prevent oscillation of the system and attain stability the rate of feed is further increased by a predetermined constant amount when the level is below the range, this further increase in feed rate being removed when the level returns to the range. The rate of feed is further decreased by a predetermined constant amount when the level is above the range, the further decrease in feed rate being removed when the level returns to the range.

---

The invention is disclosed and described in connection with measuring and regulating the level of fluid materials such as molten glass in a feeder from which glass fibers are drawn. However, it is to be noted that the method and apparatus may be utilized for controlling the level of materials and other applications, for example the level of molten glass in a glass melting furnace from which molten glass is constantly removed and to which glass forming materials are constantly added.

As is well known, the maintenance of an exacting level of liquid material within a container is extremely important in many manufacturing operations, both for maintenance of operating stability of processing equipment involved, and often more importantly, for maintenance of quality in products produced. The manufacture of glass fibers for textile strands and yarns is one manufacturing process requiring such control, and one of the processes to which the present invention is particularly adaptable. By way of example, the manufacture of continuous glass fibers by mechanical attenuation for textile products involves the withdrawal of molten glass from a container while the molten material is maintained at a constant temperature. The orifices of a feeder associated with such a container of molten glass are usually located on the underside of the container and are subjected to the head of molten material thereabove. Upon withdrawal of material from the orifices, the head of the material is an important factor determining the diameter of the fibers being attenuated. The maintenance of a constant level, or constant head of material above the orifices therefore plays an important part in the determination of the uniformity of diameters of the plurality of fibers produced as well as the end-to-end diameter of each such fiber. In view of the ever increasing demand for such fibers, and their wide range of use for industrial purposes, the tolerances, or tolerable range of variation for general use has been constantly narrowed. To establish such production on a constant basis it becomes necessary, besides exercise of exacting temperature and viscosity controls, that the head of the liquid be also exactingly controlled to practically negligible variations in level.

Advances have been made in level controls in the past. One such advance has been made in the use of an electrical probe inserted into the glass in a feeder and controlling the rate of feed thereto by the variance in electrical resistance on the probe. However, some difficulties have been encountered in that foam, for example, on the body of material will interfere with the resistance characteristics of the probe and will not permit the close control now required. Poor performance by any level control will adversely affect bushing life and bushing performance.

Accordingly, it is an object of the present invention to provide an improved method and apparatus for level control.

It is a further object of this invention to provide an economical method and means for exactly controlling the level of materials within a narrow range in liquid form within a container.

It is another object of the invention to provide a liquid level control adaptable to detection and maintenance of a level within an extremely small range and quickly active to correct deviation from the preselected range.

It is still another object of the present invention to provide a level detection and control means adaptable to maintenance of given liquid levels, such method and means being capable of withstanding high temperatures to permit its use in the maintenance of levels of molten fluid.

Apparatus for carrying out the above method and accomplishing the object of this invention features means for detecting levels outside a desired range and providing a first signal for levels below said range and a second signal for levels above said range, means for generating a signal for controlling the rate of feed of replenishing molten glass to the container, means responsive to the first and second signals for respectively increasing and decreasing the magnitude of the control signal in proportion to the time the first and second signals appear when the level is above and below the desired range, means for adding a third anticipating signal to the control signal only during the period of control signal increase, and means for subtracting a fourth anticipating signal from the control signal only during the period of control signal decrease.

The level detecting means may include pneumatic probe means, pneumatic switching means responsive to the pneumatic probe means, and first and second signal generating means responsive to the pneumatic switching means.

The control signal generating means may comprise variable transformer means, the means for increasing and decreasing the control signal comprising motor means connected to vary the output of the variable transformer in response to the first and second signals.

Alternatively, the control signal generating means may comprise a voltage dividing network, the means for increasing and decreasing the control signal comprising motor means connected to vary the value of a component in the network in response to the first and second signals.

The apparatus may further include glass melting means and means for selectively applying heat to the melting means, the selective heat applying means being responsive to the control signal to vary the heat applied to the melting means and thus the rate of feed of the replenishing material. The third and fourth anticipating signals may be connected in series with the output of the variable transformer means to provide a constant increase and a constant decrease. The magnitudes of the third and fourth constants may be substantially the same. Alternatively, the apparatus may include means for connecting supply means to the voltage dividing network and means for connecting the third and fourth anticipating signals in circuit with the supply means in the network whereby the third and fourth signals are proportional in magnitude to the control signal.

Other objects, advantages and features of this invention will become apparent when the following description is taken in conjunction with the accompanying drawings, in which.

It will be understood that although the invention as herein described and illustrated is disclosed in conjunction with glass fiber forming operations, the invention has broader application and is adaptable to measurement and control of level in a variety of instances.

Figure 1:
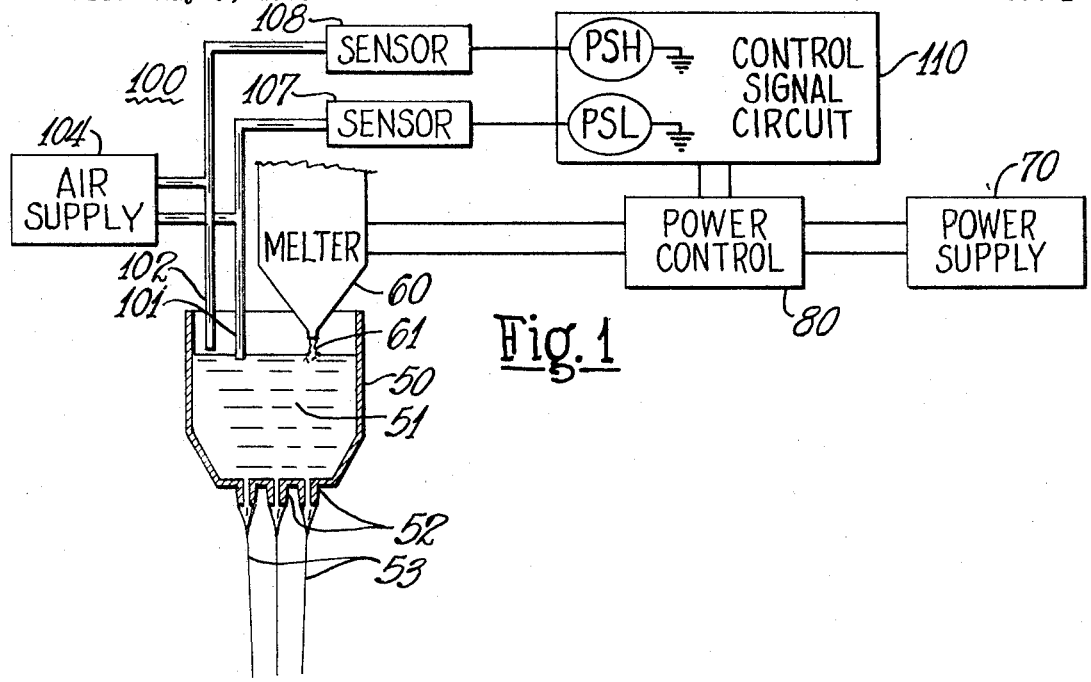
FIG. 1 is a schematic and diagrammatic illustration of the arrangement of apparatus wherein the liquid level of glass is a feeder or bushing from which fibers are attenuated is controlled by apparatus according to the present invention.

Referring to FIG. 1 there is illustrated a molten glass feeder 50 containing a molten body of glass 51 which is supplied with heat and maintained at a uniform temperature by direct passage of electrical current through the feeder by way of power connections to oppositely disposed terminals (not shown). Continuous fibers 53 are attenuated from orificed tips 52 in the bottom of the feeder 50 and are gathered together into a strand by passage over a gathering member in a manner well known to those in the art. The fibers may be supplied with a sizing fluid at the gathering member and a successively formed portion of the strand resulting from the gathering of the fibers may be wound into a package by a winder as the strand is caused to traverse the package by a traverse mechanism.

The molten body 51 in the feeder 50 from which the fibers 53 are attenuated is replenished with molten material supplied from an orificed pre-melting unit 60 disposed above a feeder or bushing 50. The pre-melting unit is electrically heated by passage of electrical current therethrough from terminals thereon which are connected to an electrical energy source 70 through a power control means 80. The power control means 80 may include a power transformer and a saturable core reactor for controlling the current output from the transformer, the saturable core reactor or other control means being responsive to an output signal from the control signal circuit 110.

The molten body within the pre-melting unit 60 may be a melt down of solid quantities of the material fed thereto, such as marbles supplied from a hopper. The marbles are supplied in bulk form and are fed to the molten body within the pre-melter 60 at a rate determined by the melting rate corresponding to the magnitude of electrical current flowing through the unit 60. The more current flowing through the pre-melting unit 60, the greater is the rate of consumption of marbles from the hopper and, correspondingly, the faster is the rate of supply of the molten material therefrom in the form of a stream 61 flowed through the orifices in the bottom of the pre-melting unit 60.

According to the present invention the rate of flow of the material in the stream 61 to the body of material 51 in the bushing 50 is matched to the withdrawal of molten material from the body 51 by the level-control circuit which regulates the current flow and correspondingly the melting rate of the pre-melter unit 60.

In the apparatus herein the level is maintained within a desired very small range as sensed by a sensing unit 100. The unit 100 comprises pneumatic probes 101 and 102 fed by a regulated air supply 104. When the level reaches or passes lower probe 101 a sensor 107 detects the change in air flow and thus the level at that point and provides an output to energize relay PSL in circuit 110. When the level reaches or passes probe 102 sensor 108 similarly detects this level and provides an electrical output for energizing relay PSH in circuit 110.

The sensors 107 and 108 may be fluidic devices such as those commercially available from Corning Glassworks which are called Schmitt triggers. These devices sense extremely small changes in flow through the pneumatic probes. The small pressure change in the probe accompanying the small change in flow is amplified by the sensor to such an extent that a switch is actuated. The switch is used as an interface to an electromechanical device such as relays PSL and PSH in circuit 110 to generate first and second signals.

While the sensing system illustrated in FIG. 1 is shown as utilizing two probes, pneumatic in operation, it is to be noted that a sensing means may be utilized which would provide a first and second signal in accordance with the teachings of this invention to note the upper and lower limits of a range within which the level is to be controlled. For example, a single pneumatic probe may be utilized which provides a first signal when the level reaches the probe opening and a second signal which is derived from a change in air pressure or flow within the probe as the level rises above the air opening thus providing a higher pressure which may be detected and utilized to provide the second signal.

For gross level control the apparatus just described can be utilized to turn feed rates between a zero or "off" position and a predetermined feed rate or "on" position. For the finer control required in the fiber-forming industry as described hereinbefore, a more complex system is utilized as illustrated.

Figure 2:
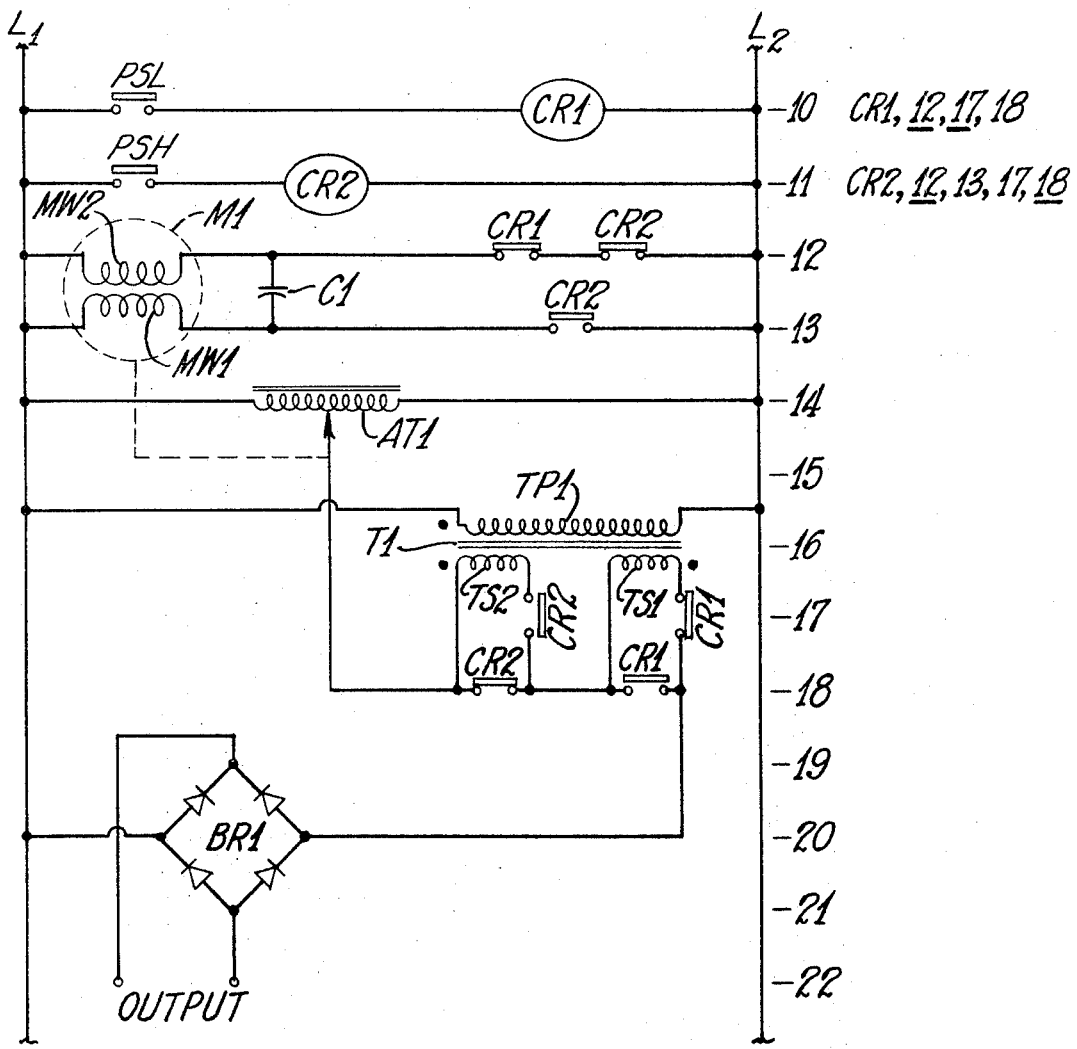
FIG. 2 is a schematic diagram of a circuit for producing a control signal in accordance with the teachings of this invention.
Figure 3:
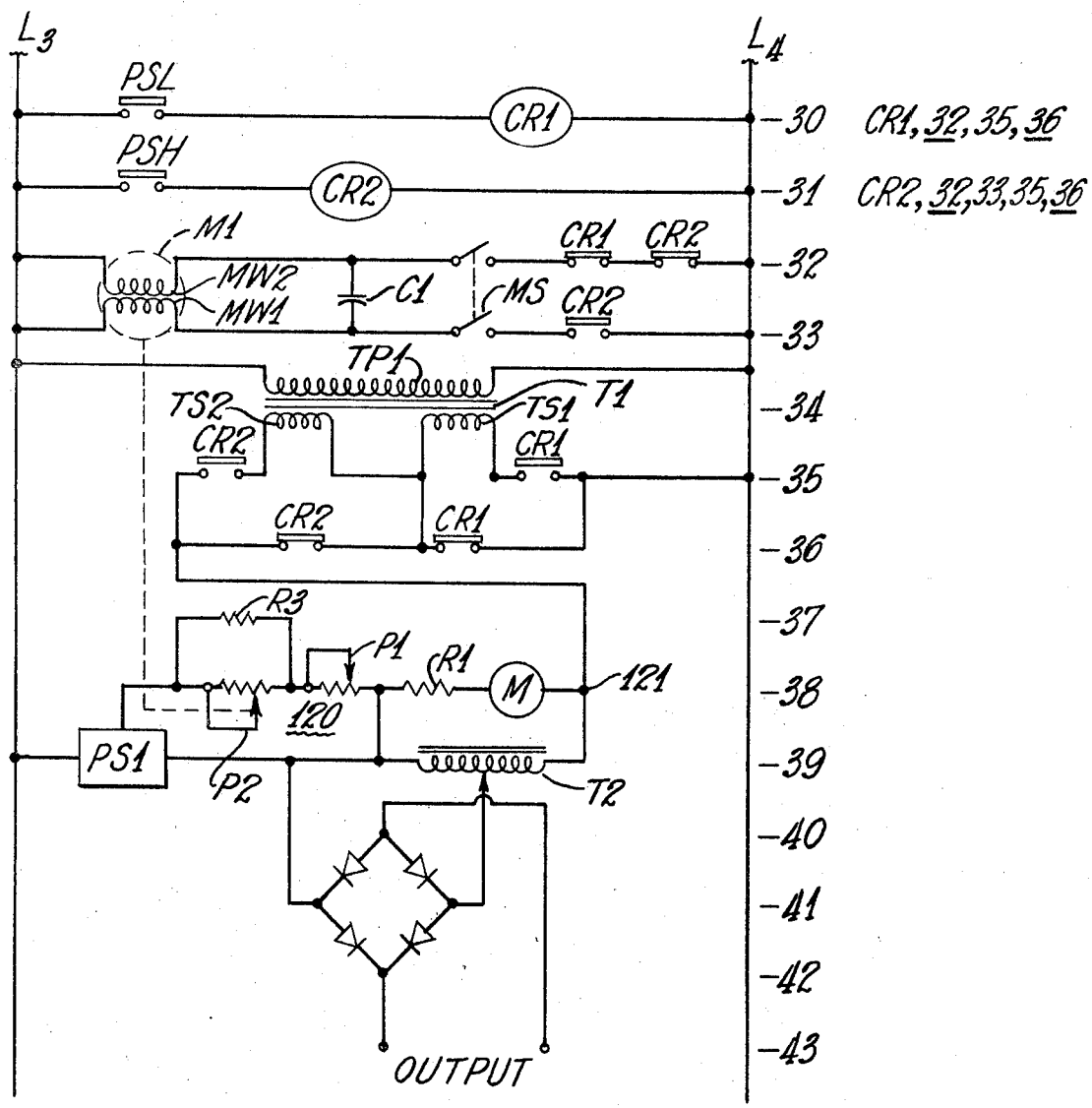
FIG. 3 is a schematic diagram of a second embodiment of a circuit for producing a control signal according to this invention.

It will be noted in FIGS. 2 and 3 that numbered line diagrams have been utilized to illustrate the circuitry. The components can be readily located by reference to the line number where the component is positioned. Further, contact switching operations may be noted without designating a mechanical tie between the contact and the actuating means. The contacts may be located at any convenient position, even though quite remote from their actuating means. Cross reference between the actuating means and its associated contacts is easily accomplished by noting in the right-hand margin of the drawing the reference character of the actuating means, for example, CR1, a relay, adjacent the line 10 in FIG. 2, the line at which contact actuating means CR1 appears. Following the reference character there are noted the line numbers in which the CR1 contacts close or open when caused to do so by the actuating means. A normally open contact is denoted by the line number in which the contact appears such as 18, the line number not being underlined. A normally closed or back contact of the relay is noted by the line number in which the back contact appears, the line number being underlined, such as line Nos. 12 and 17 for the relay CR1.

Referring to FIG. 2 the operation thereof is as follows. When the level of the body of glass 51 is below both probes both contacts PSL and PSH in lines 10 and 11 are open. Relay coils CR1 and CR2 in lines 10 and 11 are not energized. A circuit is thus established through CR1 and CR2 back contacts in line 12 through motor winding MW2 of motor M1 in lines 12 and 13. When the motor winding MW2 is energized, the motor M1 is driven in a direction to change the output of a variable transformer AT1 located in line 14. This increases the output from the variable transformer AT1 which is rectified by bridge BR1 in line 20 to provide a DC control signal at output terminals in line 22 to increase the melting rate via the power control means 80 in FIG. 1.

When the level is between the probes 101 and 102 probe 101 senses that the level of the body of material 51 is at or above probe 101 or the lower limit of the range and energizes relay PSL closing contact PSL in line 10 of FIG. 2. Since the level of the body 51 is not yet to or above probe 102, contact PSH in line 11 remains open. Back contacts CR1 in line 12 open in response to the energization of relay CR1 thus deenergizing the motor winding MW2. Since contacts CR2 are still open in line 13 the motor M1 does not receive current to either of its windings and the output of variable transformer AT1 remains the same. Thus the feed rate is clamped when the level is between probes 101 and 102.

If the feed rate or melting rate at which the output signal has been clamped as described hereinbefore is too high, the level of the body of material 51 will continue to rise until probe 102 senses the level at the upper limit of the desired range. Relay PSH is therefore energized and contacts PSH in line 11 close energizing relay CR2. Contacts PSL in line 10 are already energized and the condition of relay CR1 remains the same.

Front contacts CR2 in line 13 now close energizing motor winding MW1 which is connected to the adjustable tap of the transformer AT1 to lower the output of the transformer AT1 and thus decrease the melting rate or feed rate of material to the body 51. When, as a result of the decrease in feed rate, the level proceeds to a point below probe 102 relay PSH is deenergized and PSH contacts in line 11 open. Relay CR2 is deenergized, opening front contacts CR2 in line 13. Motor winding MW1 is thus deenergized and the output of the variable transformer AT1 is clamped at that level of feed.

It has been found that when the level is controlled within a very small range or when transient conditions change the throughput of the system to a significant degree that the foregoing method and apparatus of control may oscillate to such an extent that the amplitude builds up and the saturation point of the control system is eventually reached, which adversely affects bushing performance and bushing life. This occurs in part because of the lag between the controller output and the actual level or level signal. The controller described above integrated the time that the level was outside the desired range and changed the increase or decrease in feed rate in proportion to the time the level was outside that range. However, because of the lag just discussed, the melting rate or feed rate is a little too high or a little too low. For example if the rate is a little too high and changes are made accordingly, the level will eventually rebuild to the high probe. At that point the integration is started in a downward direction and through repetition oscillation may eventually result. Therefore, there is provided herein an additive increase and an additive decrease in feed rates to anticipate what is going to happen next. It has been found that a constant, which may be calculated for each system, may be added to the control system which will prevent oscillation and allow stable operation. The larger the value of this constant the longer it takes the system to reach the final control level and the more upsetting it is to the system during adjustment. Therefore the value of the constant is chosen so that it will not upset the operation of the system yet will provide a sufficiently large anticipation that operation of the system will be stable.

Referring to FIG. 2 the constants are added and subtracted as follows. A transformer T1 is provided in line 16 having a primery winding TP1 connected across the voltage supply source. Secondary windings TS1 and TS2 provide signal additives and signal decreases to be selectively connected to the output of the system.

When the level is below probe 101 constact PSL in line 10 is open, as is contact PSH in line 11. Relays CR1 and CR2 are therefore deenergized and back contacts CR1, CR2 in line 12 are closed completing a circuit for the energization of motor winding MW2 to increase the output of variable transformer AT1.

In addition to the signal derived from the output transformer AT1, back contacts CR2 in line 18 and back contacts CR1 in line 17 are closed connecting secondary winding TS1 in series with the output from transformer AT1. The voltage appearing on transformer secondary winding TS1 adds to the output from transformer AT1, further increasing the rate of feed via the adjusted control signal appearing on the output terminals in line 22. Thus a third signal, or a first additional or anticipating signal, is added to the output signal from AT1 to further increase the control signal.

When the level reaches the lower probe 101, contact PSL closes in line 10 energizing relay CR1. Back contact CR1 in line 12 opens deenergizing the motor M1 and clamping the output of variable transformer AT1 at its present rate of feed signal. Back contacts CR1 in line 17 open and front contact CR1 in line 18 closes to remove the third, or first additional, signal from the output voltage. This may be seen by referring to the graphical representation in FIG. 4, if it is assumed that the probe 101 is reached at time TM1.

Assume that the rate of feed reached at time TM1 is insufficient so that the level eventually falls below probe 101 at time TM2. Contact PSL opens deenergizing relay CR1. Back contact CR1 in line 12 again closes energizing winding MW2 to increase the output from variable transformer AT1. As noted in the graphical representation in FIG. 4, back contact CR1 closes in line 17 and front contact CR1 opens in line 18 to again add in a third signal, or a first additional signal, to the control signal appearing on the output terminals on line 22.

Assume that the rate of feed must be increased until time TM3 on the graphical representation in FIG. 4, before the level again hits probe 101. The sequence noted hereinbefore repeats itself with the constant supplied from winding TS1 being removed and the rate of feed control signal being clamped at that level.

Figure 4:
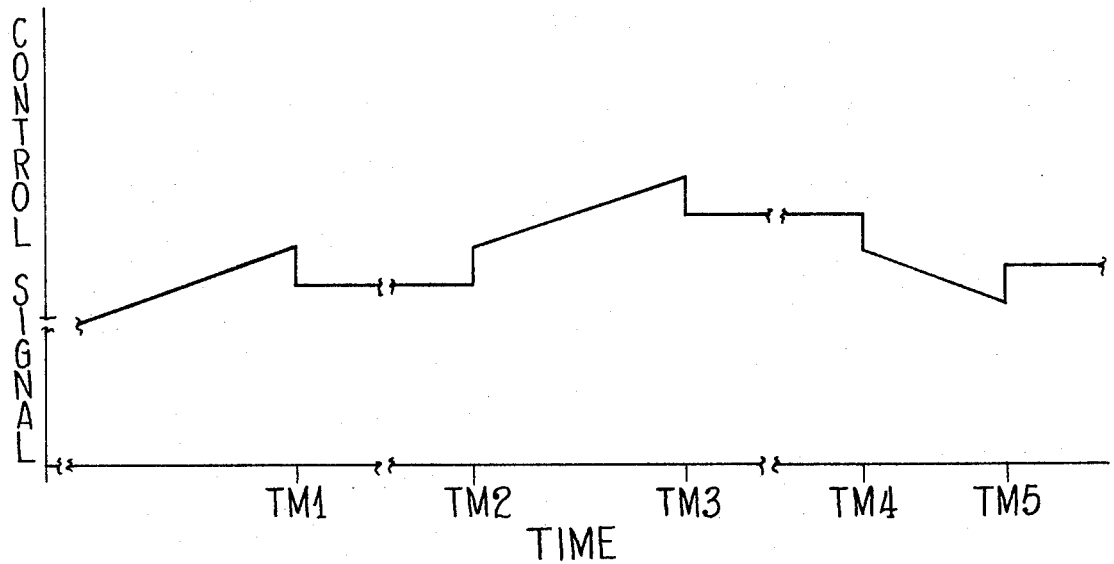
FIG. 4 is a graphical representation of a control signal output which may be obtained from the circuits illustrated in FIGS. 2 and 3.

Assume that the rate of feed signal arrived at time TM3 is too large and that at time TM4 the level of the liquid 51 rises to reach probe 102. Contact PSH in line 11 closes energizing relay CR2. Back contacts CR2 in line 12 open disabling motor winding MW2 while front contacts CR2 in line 13 close energizing motor winding MW1 to decrease the output from variable transformer AT1. Front contacts CR2 in line 17 close and back contacts CR2 in line 18 open to combine a fourth signal, or a second additional signal, in series with the output voltage from variable transformer AT1. As noted from the polarity dots in FIG. 2 the voltage supplied by winding TS2 is in bucking relationship or subtractive relationship with the output voltage from transformer AT1. Thus, as shown in FIG. 4 at time TM4, an anticipating voltage constant is subtracted from the control signal during the period of decrease.

Assume that at time TM5 the level goes below probe 102. Contacts PSH in line 11 open deenergizing relay CR2. Front contacts CR2 in line 13 open deenergizing motor winding MW1 and clamping the output from the transformer AT1 at that level. Front contacts CR2 in line 17 open and back contacts CR2 in line 18 close to remove the fourth signal, or second additional signal, from its subtractive relationship with the output voltage from transformer AT1. The result is reflected in the graphical representation of FIG. 4 wherein the subtractive voltage constant is removed from the rate of feed signal.

The above described sequences are repeated until the system reaches stability. It has been shown mathematically that the use of the additive and subtractive anticipating voltages as described hereinbefore provides a faster response to the system's needs and prevents any possibility of oscillation in the system described.

Referring to FIG. 3 there is shown an alternative embodiment of a control signal circuit 110. The components in lines 30 to 33 of FIG. 3 are identical in operation to those shown and described hereinbefore with respect to the components in lines 10 to 13 of FIG. 2. A switch MS in lines 32 and 33 has been added to illustrate that the system may be operated either manually or automatically.

A control signal generator circuit 120 is illustrated in lines 37 through 39 and comprises components connected in a voltage dividing network between terminal 121 and power lead L3. A meter M and resistance R1 are connected in series, and this series combination is connected in parallel with a variable output transformer T2. A potentiometer P1 and a potentiometer P2 are connected in series between the junction of T2 and R1 and a phase control device PS1. The junction of resistor R1 and transformer T2 is connected to another terminal of the device PS1. A current limiting and adjusting resistor R3 is connected in parallel with the potentiometer P2.

For manual adjustment of the output signal the potentiometer P1 may be manually adjusted to provide the signal desired across transformer T2.

The adjustable potentiometer P2 is connected to be driven by the motor M1 which is responsive to the first and second signals derived from the PSL and PSH contacts in lines 30 and 31, as hereinbefore described. Thus, a voltage divider network 120 has been provided for generating a control signal, the network having a component (potentiometer P2) connected to be varied in response to high and low probe signals to in turn vary the output from the voltage divider network through the bridge BR1 in line 41 to provide a direct current output at terminals in line 43.

The circuit in FIG. 3 also differs in that the constants to be added and subtracted from the control signal are not connected in series with the output as illustrated in FIG. 2. In FIG. 2 predetermined voltages are added and subtracted from the rate of feed signal during the periods of increase and decrease of the feed rate. These voltages do not vary and are fixed since they are connected in series with the output of the transformer AT1 in line 14 of FIG. 2.

However, in FIG. 3 the secondary windings TS1 and TS2 of the transformer T1 located in line 34 are connected in series with the supply voltage to be applied to the voltage divider network 120. Although the voltages supplied on windings TS1 and TS2 are constant in that their output does not change, their effect, when added to the voltage supplied to the voltage dividing network 120, is to provide additive and subtractive signals which are proportional to the output signal itself and/or proportional to the amount of increase and decrease of the output signal from transformer T2.

In operation when the level is below probe 101 contacts PSL and PSH in lines 30, 31 are open maintaining relays CR1 and CR2 deenergized. A circuit is established through back contacts CR1, CR2 and closed switching means MS in line 32 to energize motor winding MW2 of motor M1 to drive potentiometer P2 to increase the control signal derived from transformer T2 through bridge BR1 to output terminals in line 43. Front contacts CR1 and CR2 in line 35 are open while back contacts CR1, CR2 in line 36 are closed. Thus, secondary windings TS1 and TS2 are not connected in circuit with the supply voltage connected to the voltage divider network 121.

When level of the material 51 reaches probe 101 contacts PSL in line 30 close energizing relay CR1. Back contacts CR1 open in line 32 deenergizing motor M1. Front contacts CR1 in line 35 close and back contacts CR1 in line 36 open connecting secondary winding TS1 in circuit with the supply voltage to the voltage divider network 120. TS1 is wound to supply voltage which bucks or subtracts from the voltage supply to network 120, thus subtracting a proportionate amount from the control signal supplied from the transformer T2. This is again illustrated at time TM1 in the graphical representation in FIG. 4.

If the level again falls below probe 101 then relay CR1 in line 30 is deenergized, front contacts CR1 in line 35 open and back contacts CR1 in line 36 close making the supply voltage to terminal 121 larger as illustrated at time TM2 in FIG. 4.

Similarly, if the probe 102 is reached, as at time TM4 in FIG. 4, contact PSH in line 31 closes energizing relay CR2. Front contacts CR2 in line 35 close and back contacts CR2 in line 36 open also connecting winding TS2 in series with the supply voltage between lead L4 and terminal 121. Winding TS2 is wound to supply a voltage which bucks or subtracts from the supply voltage being applied to terminal 121 in the network 120 thus a predetermined proportional amount is subtracted from the control signal as indicated at time TM4 in FIG. 4.

When the level drops below probe 102 contact PSH opens, relay CR2 is deenergized, contact CR2 in line 35 opens and contact CR2 in line 36 closes removing the bucking voltage supplied by winding TS2. The control voltage at that point then rises as indicated at time TM5 in FIG. 4.

Thus, in FIG. 3 the constant is added into the supply voltage being applied to terminal 121 while the voltage is increasing and a constant is subtracted therefrom when bucking voltage from winding TS1 is subtracted from supply voltage applied to terminal 121 when probe 101 is reached. When the level reaches probe 102 the proportional constant provided by winding TS2 is subtracted from the supply voltage applied to terminal 121 during the period of control signal decrease. The difference in operation between FIGS. 2 and 3 is that the constants added and subtracted in FIG. 2 remain the same in magnitude whereas the constants added and subtracted in FIG. 3 are varying the control signal in a proportional manner from the output transformer T2.

There has thus been described and disclosed hereinbefore apparatus for maintaining the level of a body of material in a container within a predetermined range by replenishing material removed from the body comprising means for detecting level below the range and providing a first signal and detecting levels above the range and providing a second signal. Means are shown for generating a signal to control the rate of feed of replenishing material to the body. Means responsive to the first signal increases the control signal an amount proportional to the time the first signal is present. Means responsive to the second signal decreases the control signal an amount proportional to the time a second signal is present.

Means are further included for adding a first additional predetermined signal to the control signal only when the control signal is being increased, and means are also provided for subtracting a second additional predetermined signal from the control signal only when the control signal is being decreased.

The magnitudes of the first and second additional signals may be held at constant values and at substantially the same values. Means are shown for connecting the first and second additional signals in series with the output of the control signal generating means. The first and second additional signal means may comprise transformer means having first and second secondary winding means and switching means responsive to the first and second signals.

The magnitudes of the first and second additional signals may be made proportional to the amount of the increase and decrease of the control signal, respectively. To obtain this, means are shown for connecting supply means to the control signal generating means for modification into the control signal by the means for increasing and decreasing the control signal. Switching means may be utilized for connecting the first additional and second additional signal means in circuit with the supply means whereby the first and second additional signals are proportional in magnitude to the amount of increase and decrease in the control signal.

It should be noted that although the dimensions of the range of level control have not been specified, in the production of quality glass fibers the range will naturally be very narrow. In fact in very sophisticated applications of this invention, the range may be zero.

In conclusion, it is to be noted that the embodiments disclosed and described herein are meant to be illustrative only and not limiting in any sense. The embodiments described serve merely to illustrate the spirit and scope of the invention.

We claim:

1. Apparatus for maintaining the level of a body of material in a container within a predetermined range by replenishing material removed from the body comprising means for detecting levels below said range and providing a first signal and for detecting levels above said range and providing a second signal, means for generating a signal to control the rate of feed of replenishing material to said body, means responsive to said first signal for continuously increasing said control signal an amount proportional to the time said first signal is continuously present, means responsive to said second signal for continuously decreasing said control signal an amount proportional to the time said second signal is continuously present, means responsive to a control signal increase for adding a first additional predetermined signal to said control signal only when said control signal is being increased, and means responsive to a control signal decrease for subtracting a second additional predetermined signal from said control signal only when said control signal is being decreased.

2. Apparatus for controlling molten glass level within a predetermined range in a container by replenishing molten glass removed from the container comprising means for detecting levels outside a desired range and providing a first signal for levels below said range and a second signal for levels above said range, means for generating a signal for controlling the rate of feed of replenishing molten glass to said container wherein an increase and decrease of said control signal respectively increases and decreases said rate of feed, means responsive to said first and second signals for respectively continuously increasing and continuously decreasing the magnitude of said control signal in proportion to the time said first and second signals are present when the level is below and above the desired range, means responsive to said first signal for adding a third signal to said control signal only during the period of control signal increase, and means responsive to said second signal for subtracting a fourth signal from said control signal only during the period of control signal decrease.

3. Apparatus as defined in claim 2 in which said control signal generating means comprises variable transformer means, and in which said means for increasing and decreasing said control signal comprises motor means connected to vary the output of said variable transformer means in response to said first and second signals.

4. Apparatus as defined in claim 2 in which said control signal generating means comprises a voltage dividing network, and in which said means for increasing and decreasing said control signal comprises motor means connected to vary the value of a component in said network in response to said first and second signals.

5. Apparatus as defined in claim 2 which further includes means for limiting the magnitudes of said third and fourth signals to substantially constant values.

6. Apparatus as defined in claim 2 which further includes means for proportioning the magnitudes of said third and fourth signals to the magnitude of said control signal.

7. Apparatus for maintaining the level of a body of material in a container by replenishing material removed from the body comprising means for detecting the level of the body in the container and providing a first signal when the level is below a predetermined point and a second signal when the level is above a predetermined point, means responsive to said first signal for continuously increasing the rate of feed of the replenishing material an amount proportional to the time the first signal is present, means responsive to said second signal for continuously decreasing the rate of feed of the replenishing material an amount proportional to the time the second signal is present, means for further increasing the rate of feed by an additional predetermined amount during the period of feed rate increase in response to the presence of said first signal, and means for further decreasing the rate of feed by an additional predetermined amount during the period of feed rate decrease in response to the presence of said second signal.

8. A method of forming continuous glass fibers of substantially uniform diameters comprising the steps of retaining a molten body of glass in a feeder; attenuating continuous fibers from streams of said molten glass flowing from orifices formed in said feeder; replenishing the molten body in said feeder from a pre-melting unit; and regulating the level of said molten body in said feeder to maintain a substantially uniform head of molten glass above said orifices by sensing levels outside of a predetermined range of levels of the molten body, continuously increasing the rate of feed of said replenishing material from said pre-melting unit by an amount proportional to the time said level is below said range, continuously decreasing the rate of feed of said replenishing material by an amount proportional to the time said level is above said range, further increasing the rate of feed from said pre-melting unit by a first predetermined amount when the level is below said range and removing said first predetermined amount of further feed rate increase when the level returns to the range, and further decreasing the rate of feed by a second predetermined amount when the level is above said range and removing said further second predetermined amount of feed rate decrease when the level returns to said range.

9. A method as defined in claim 8 in which said first and second predetermined further amounts of increase are constants.

10. A method as defined in claim 8 in which said first and second predetermined further amounts of increase are proportional to the feed rate to which they are added or subtracted, respectively.

References Cited

UNITED STATES PATENTS

| 1,961,893 | 6/1934 | Wadman et al. | 65—164 |
| 3,200,971 | 8/1965 | Trethewey | 137—403X |
| 3,358,066 | 12/1967 | Tiede et al. | 65—162UX |

HOWARD R. CAINE, Primary Examiner

R. L. LINDSAY, JR., Assistant Examiner

U.S. Cl. X.R.

65—11, 29, 161, 164; 137—403